Figure 1:
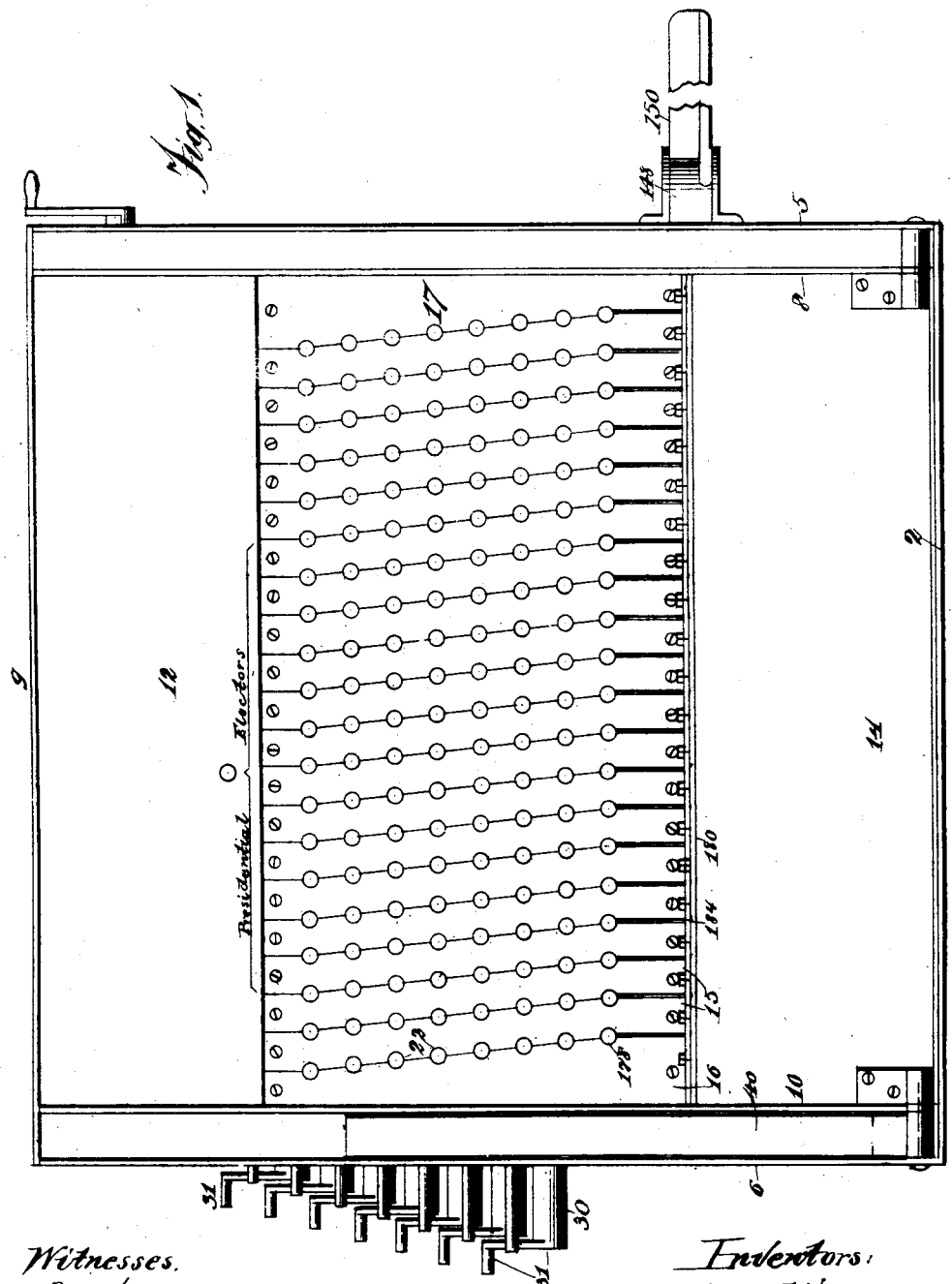

No. 865,976. PATENTED SEPT. 10, 1907.
E. B. WILLIX & E. L. KEITH.
VOTING MACHINE.
APPLICATION FILED SEPT. 26, 1905.

11 SHEETS—SHEET 1.

No. 865,976. PATENTED SEPT. 10, 1907.
E. B. WILLIX & E. L. KEITH.
VOTING MACHINE.
APPLICATION FILED SEPT. 26, 1905.

11 SHEETS—SHEET 2.

No. 865,976. PATENTED SEPT. 10, 1907.
E. B. WILLIX & E. L. KEITH.
VOTING MACHINE.
APPLICATION FILED SEPT. 26, 1905.

11 SHEETS—SHEET 5.

No. 865,976. PATENTED SEPT. 10, 1907.
E. B. WILLIX & E. L. KEITH.
VOTING MACHINE.
APPLICATION FILED SEPT. 26, 1905.

11 SHEETS—SHEET 6.

Witnesses:
B. Kennedy
W. B. Keogh

Inventors:
E. B. Willix
E. L. Keith
By M. M. Cady
Atty

No. 865,976. PATENTED SEPT. 10, 1907.
E. B. WILLIX & E. L. KEITH.
VOTING MACHINE.
APPLICATION FILED SEPT. 26, 1905.

11 SHEETS—SHEET 7.

No. 865,976. PATENTED SEPT. 10, 1907.
E. B. WILLIX & E. L. KEITH.
VOTING MACHINE.
APPLICATION FILED SEPT. 26, 1905.

11 SHEETS—SHEET 8.

Witnesses:
B. Kennedy
W. B. Keogh

Inventors:
E. B. Willix
E. L. Keith
By M. M. Cady
Atty.

No. 865,976.
PATENTED SEPT. 10, 1907.
E. B. WILLIX & E. L. KEITH.
VOTING MACHINE.
APPLICATION FILED SEPT. 26, 1905.
11 SHEETS—SHEET 9.
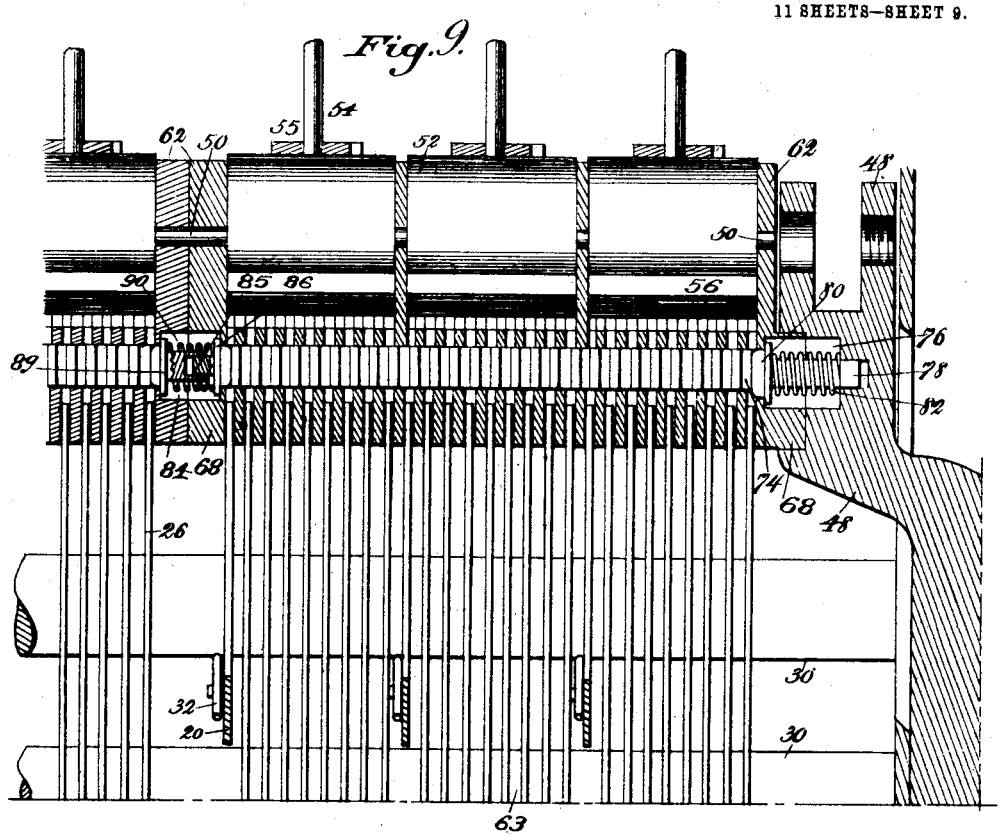
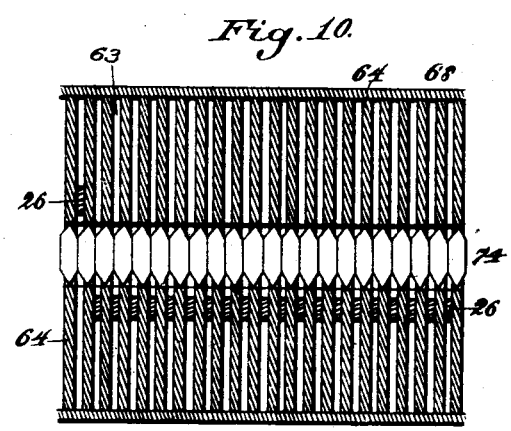
Witnesses:
Inventors:
E. B. Willix
E. L. Keith No. 865,976. PATENTED SEPT. 10, 1907.
E. B. WILLIX & E. L. KEITH.
VOTING MACHINE.
APPLICATION FILED SEPT. 26, 1905.
11 SHEETS—SHEET 10.
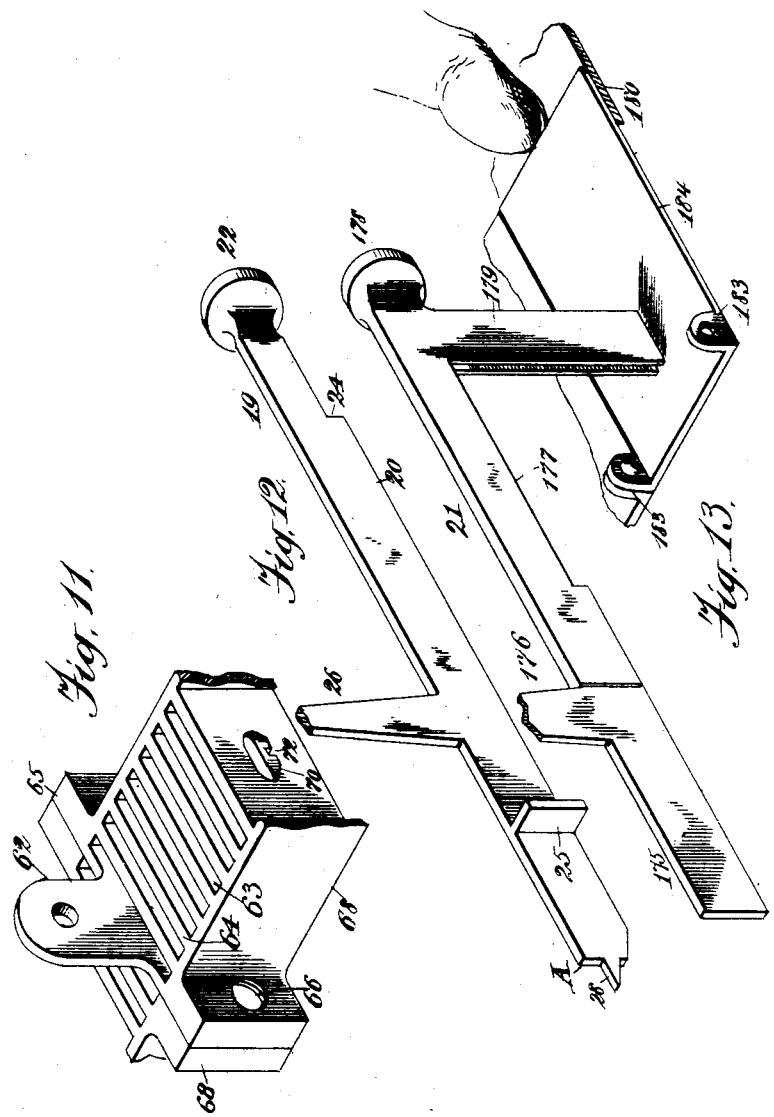

No. 865,976. PATENTED SEPT. 10, 1907.
E. B. WILLIX & E. L. KEITH.
VOTING MACHINE.
APPLICATION FILED SEPT. 26, 1905.
11 SHEETS—SHEET 11.
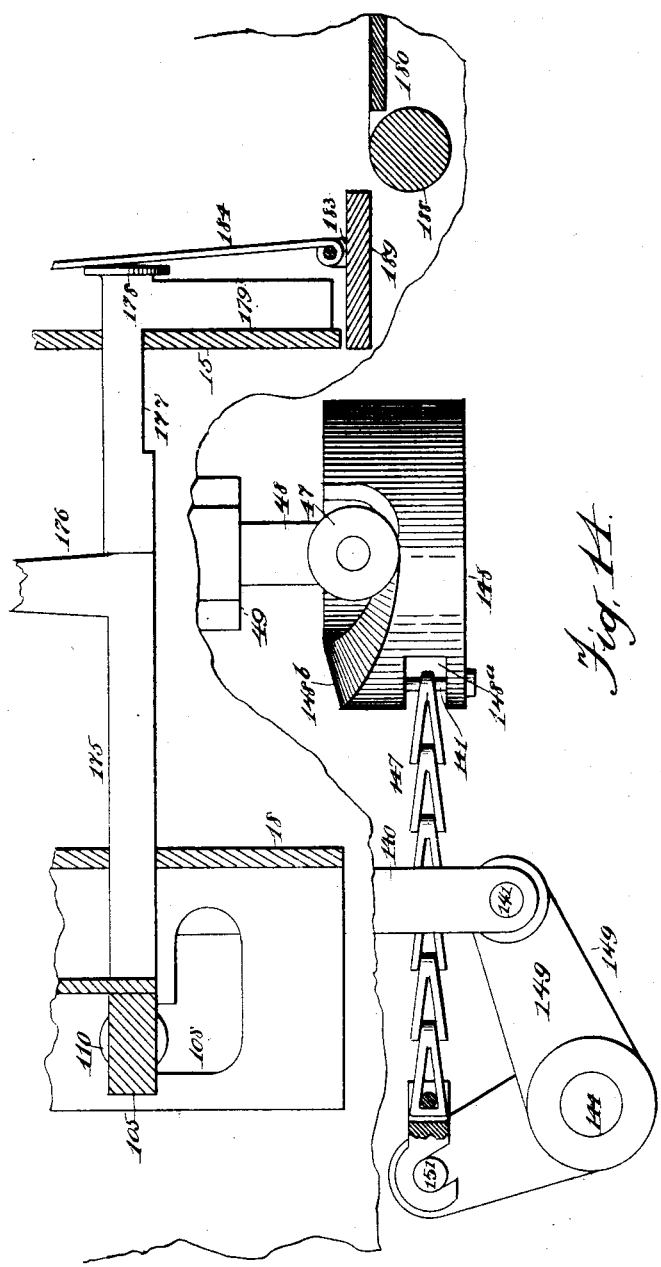

UNITED STATES PATENT OFFICE.

ENOS B. WILLIX AND ELMER L. KEITH, OF MOUNT VERNON, IOWA; SAID KEITH ASSIGNOR TO SAID WILLIX.

VOTING-MACHINE.

No. 865,976.      Specification of Letters Patent.      Patented Sept. 10, 1907.

Application filed September 26, 1905. Serial No. 280,189.

*To all whom it may concern:*

Be it known that ENOS B. WILLIX and ELMER L. KEITH, both citizens of the United States, residing at Mount Vernon, in the county of Linn and State of Iowa, have invented certain new and useful Improvements in Voting-Machines, of which the following is a specification.

Our invention relates to voting machines, and the leading objects are to change, add to and improve the machine shown in our application for voting machines filed January 6, 1905, Serial No. 239,866, with special reference to the mode of registering the votes by the voting or candidate keys engaging the registers or counters direct.

It also consists in the mode by which the frame or register-plate brings the registers into contact with the voting keys to record the vote; and also in means to restore the voting keys to their normal or unvoted position by direct engagement of the register plate with the ends of the voting keys.

It further consists in providing means for voting a ticket independent of any of the straight party tickets; and in a straight party ticket key and an independent lock operated by the straight party ticket key, whereby the elector is able to vote a straight party ticket but is prevented from voting more than one straight party ticket at the same election.

It further consists in providing canceling keys whereby the elector can vote for one or more candidates on a party ticket in a collective office and not vote for the balance of the candidates.

It also consists in locking the machine against certain electors and excluding them from voting only upon certain questions or for certain candidates on the ticket or for both.

The following specification will point out in detail the manner in which our machine is constructed and its mode of operation, when taken in connection with the drawings accompanying the same and forming part hereof, whereby the foregoing objects and others pertaining thereto are accomplished.

Figure 2:
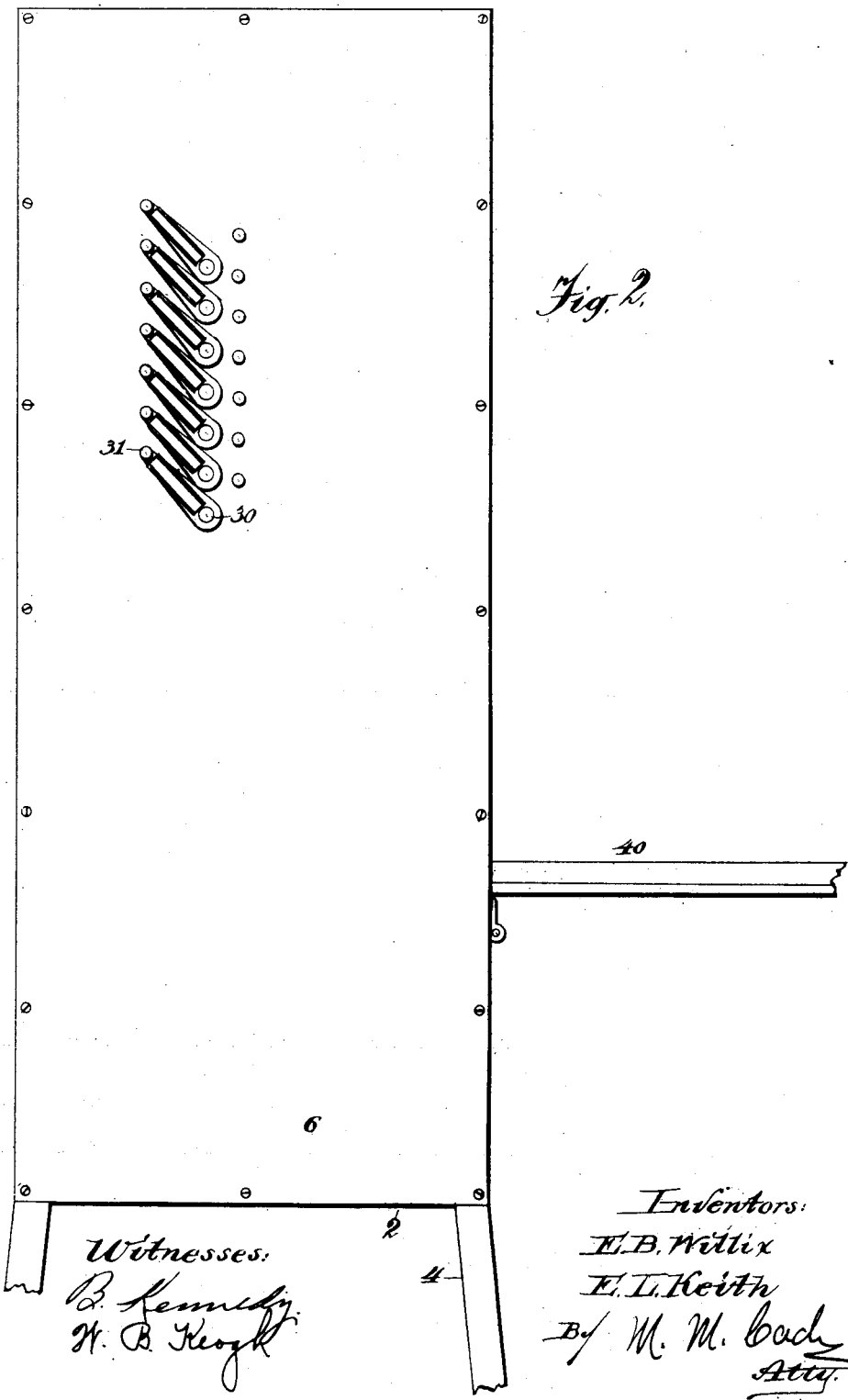
Figure 3:
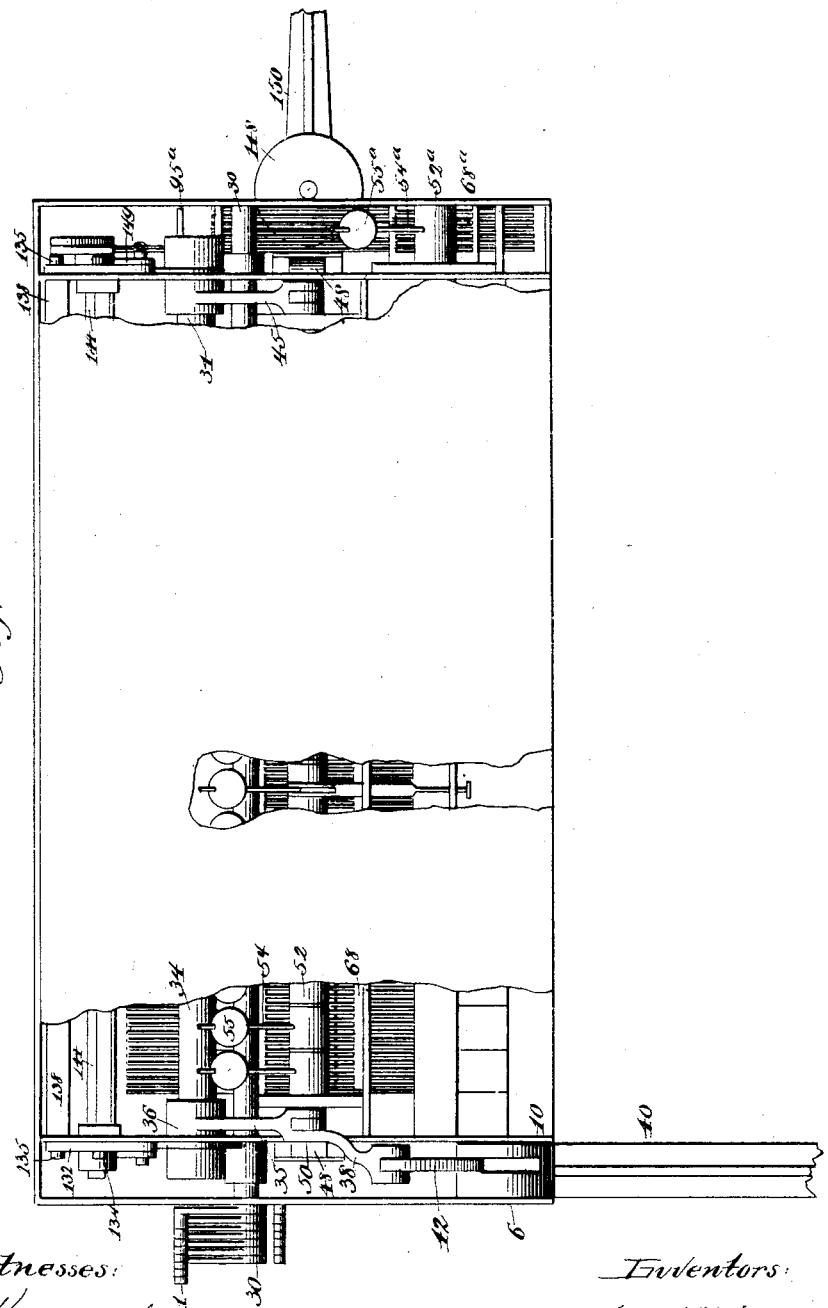
Figure 4:
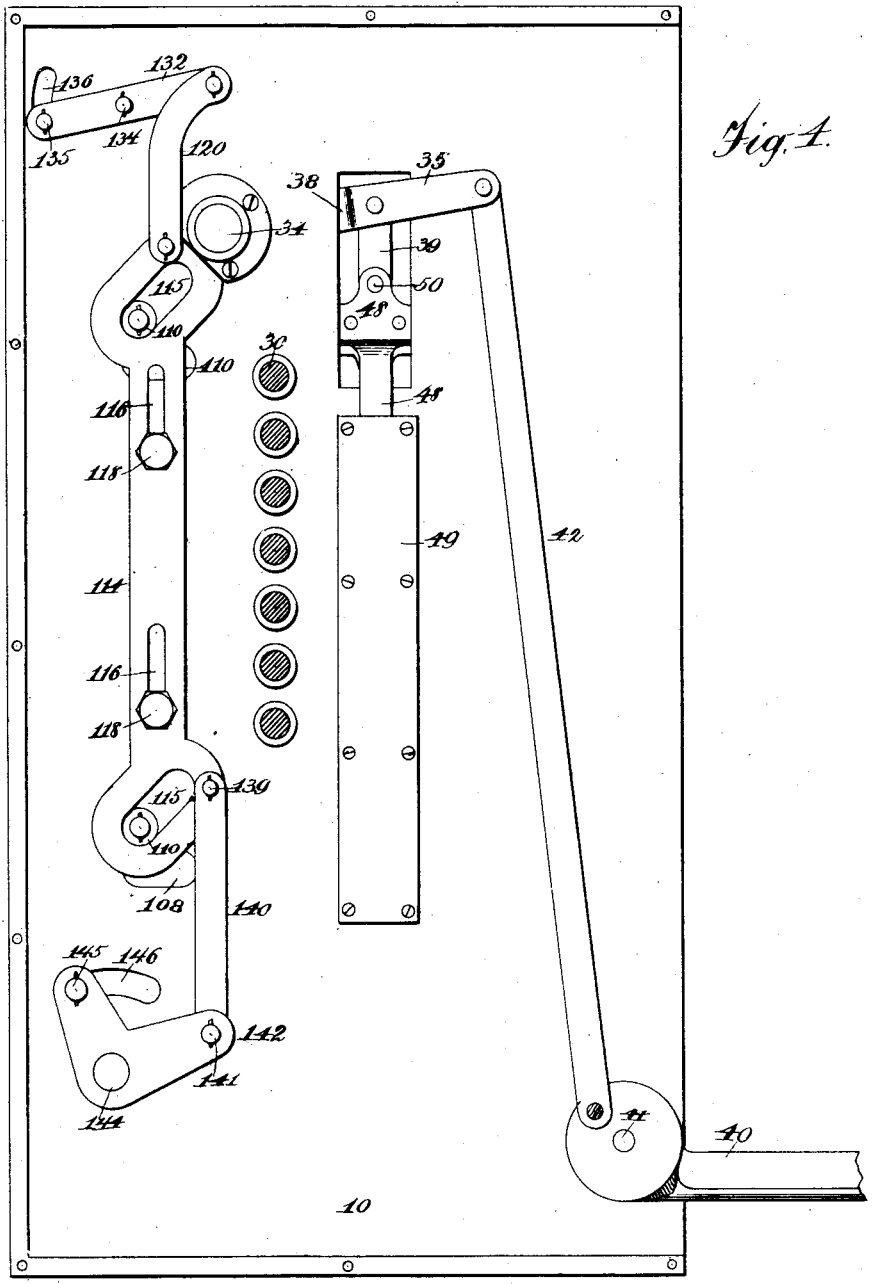
Figure 5:
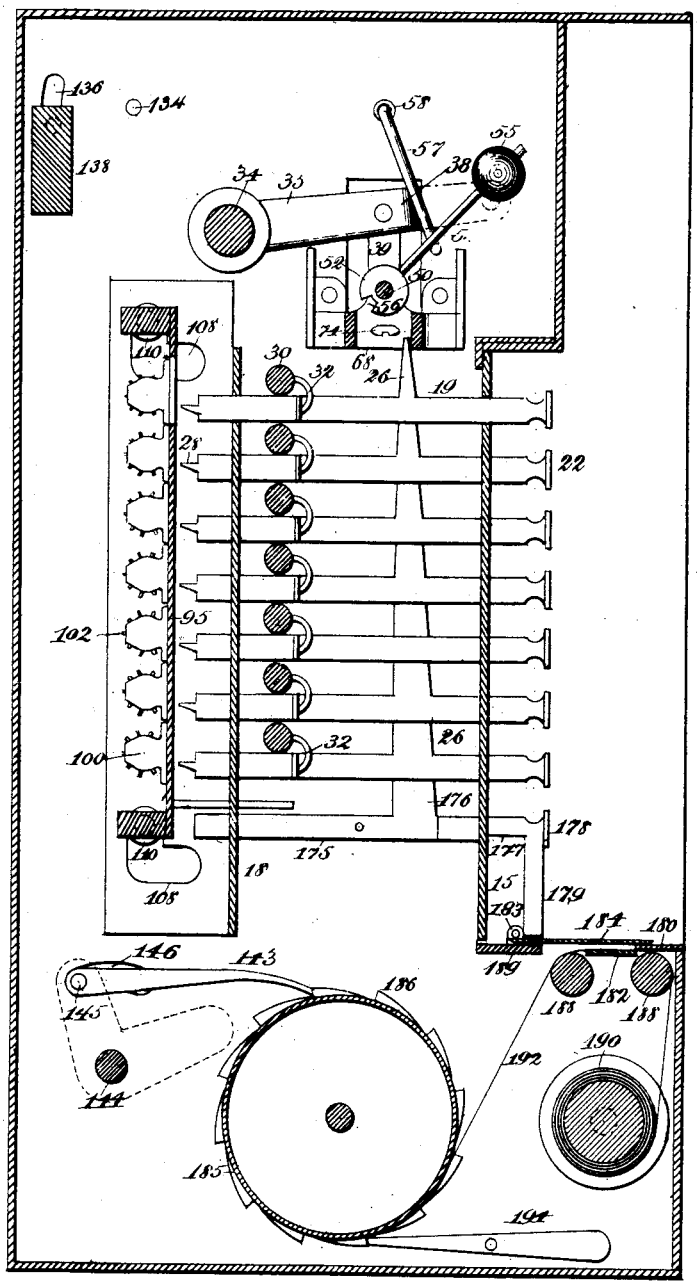
Figure 6:
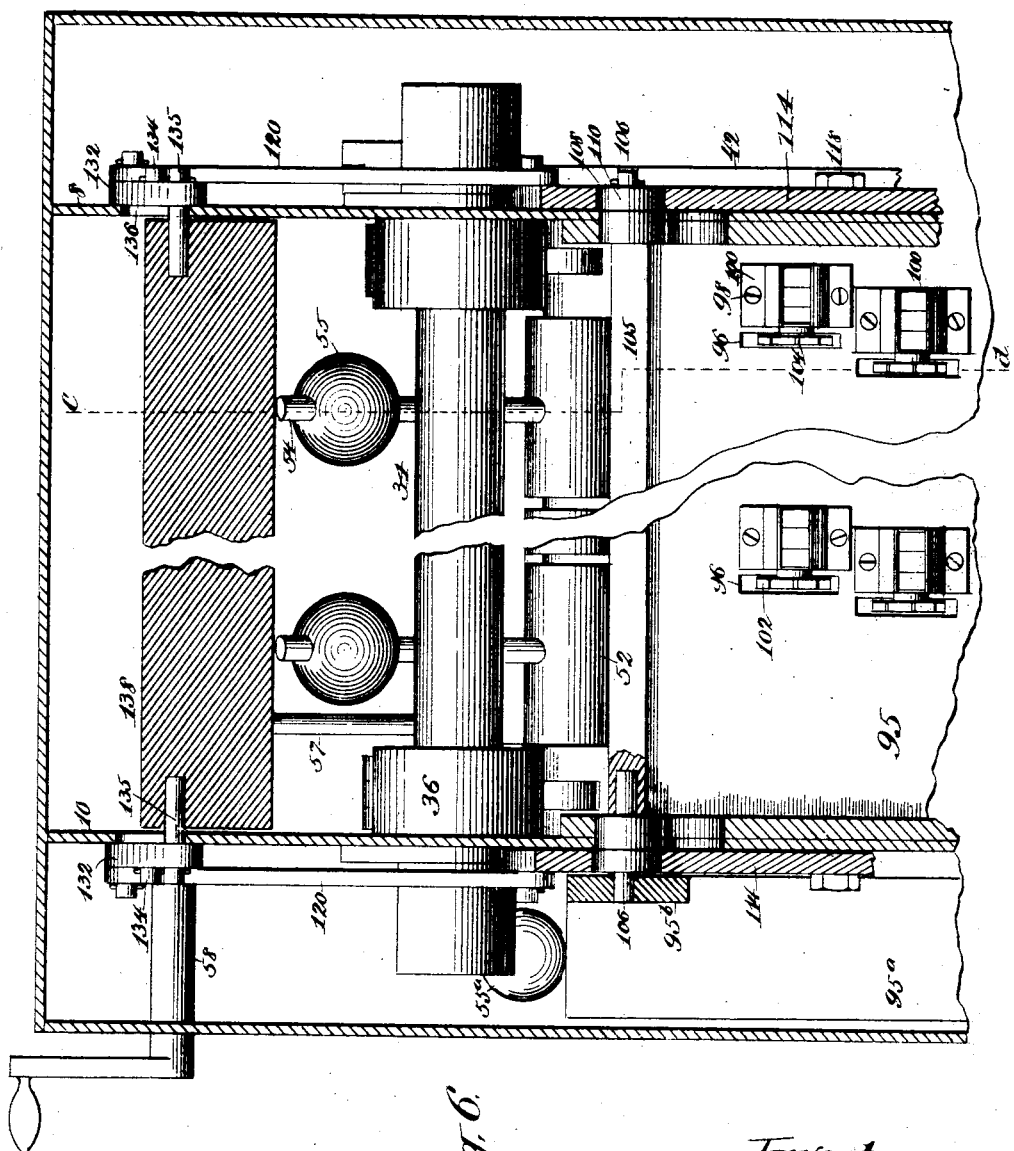
Figure 7:
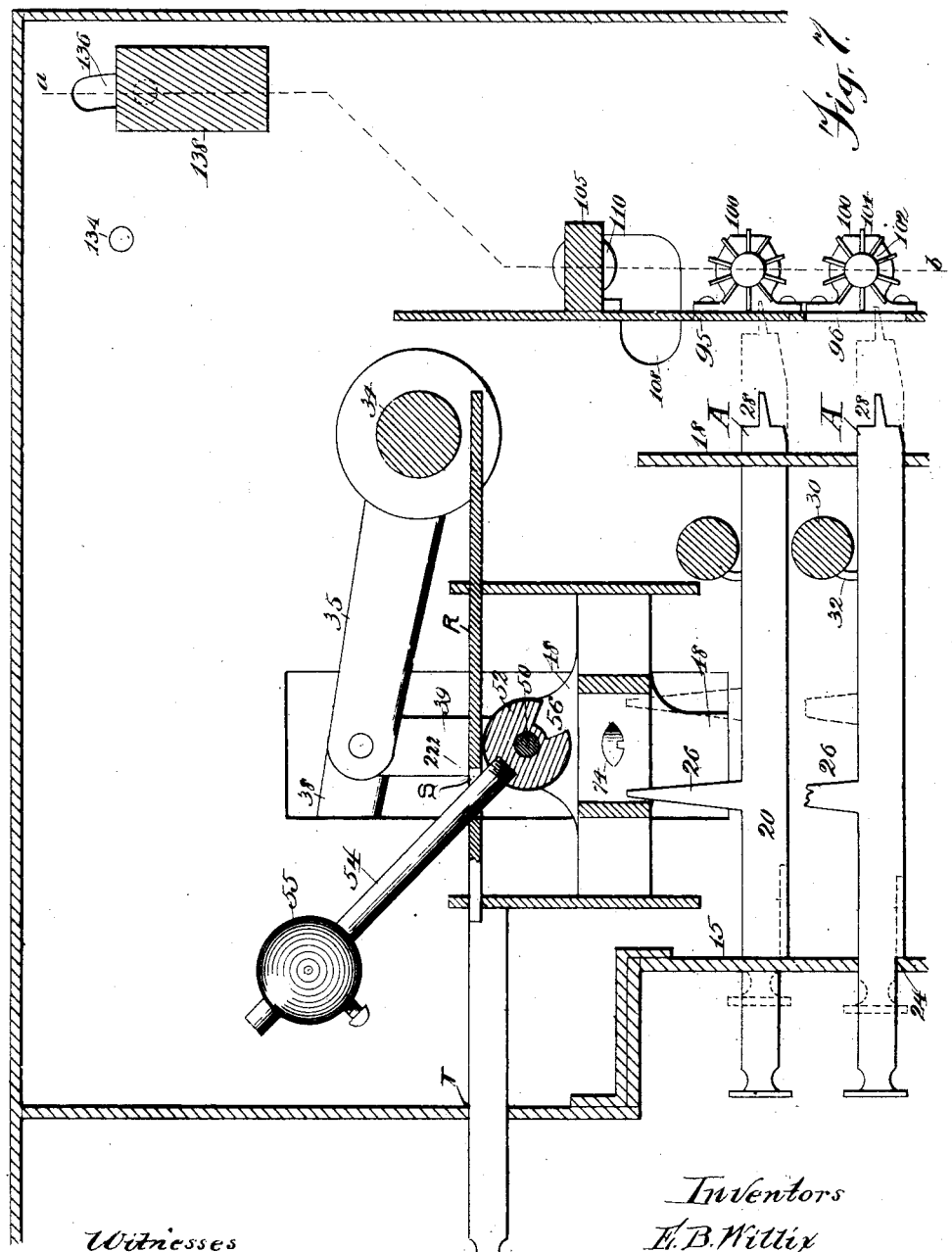
Figure 8:
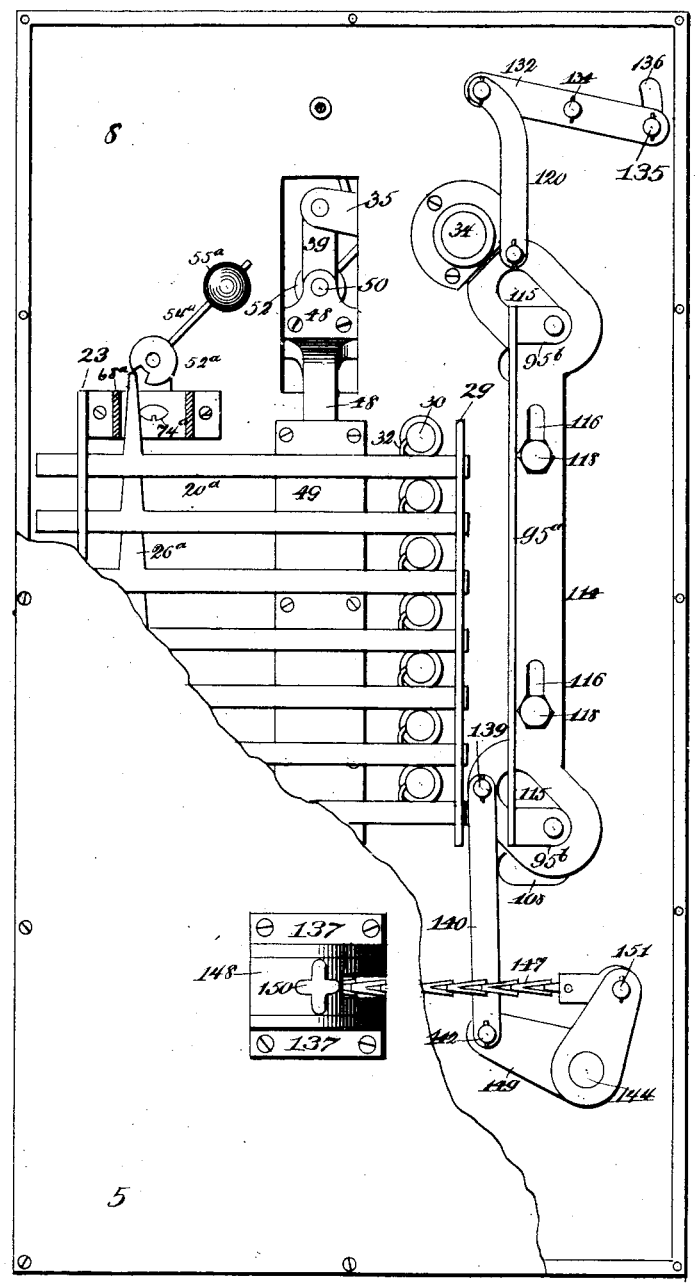

Figure 1 is a front elevation of the machine in voting position and showing a space for the presidential electors or commissioners. Fig. 2 is a left end elevation of the machine prior to the entrance of an elector to the face thereof. Fig. 3 is a plan view of the face of the machine with part cut away showing position of some of the locks and other details. Fig. 4 is a left end elevation taken from within the outer casing of the machine, partly in section, showing entrance lever and its connections together with the devices for operating the register-plate or frame that carries the registers. Fig. 5 is a vertical section through the center of Fig. 1 showing position of the candidates' keys for a given office in all of the party tickets and the canceling key, also devices for casting an independent vote for an individual not on any of the straight party tickets. Fig. 6 is a section through line $a-b$ of Fig. 7. Fig. 7 is a detailed sectional elevation taken through line $c-d$ of Fig. 6. Fig. 8 is a detailed elevation of a portion of the mechanism employed in the machine and operated in connection with parts shown in Figs. 4 and 7 also showing the straight party ticket keys and the straight party ticket lock operated thereby. Fig. 9 is a longitudinal vertical section through parts of the machine, showing the mechanism for preventing repeating and portions of the locking mechanism. Fig. 10 is a horizontal section of the guides to a lock and showing the checks for preventing repeating. Fig. 11 is a perspective view of the guides and guide-frames for the voting keys. Fig. 12 is a perspective view of one of the voting or candidates' keys. Fig. 13 is a perspective view of one of the keys for canceling a vote and also a plate used in connection with the independent voting. Fig. 14 is a detail elevation, part sectional, of a portion of the mechanism employed in the machine.

Like characters of reference denote corresponding parts in each of the figures.

The operating parts of the machine are mainly situated within a casing, having a bottom plate 2 resting upon and attached to four or more legs or supports 4, with vertical end plates 5 and 6, inner end plates or partitions 8 and 10 and a top plate 9 connected to the plates 5, 6, 8 and 10 making a rectangular frame with inner partitions near the end plates. When the machine is not in use there may be a front and rear casing removably attached to the above described casing, but as this forms no part of our invention the same is not shown or described.

Attached to the partitions 8 and 10 near the top is a plate 12 and a similar plate 14 at the bottom. Between these plates and attached to them are the front candidate or voting key plates 15, 16 and 17. The key plates 16 at the left end being wider at the bottom and the key plate 17 wider at the top and the plates 15 between of equal width but set at an angle, as shown in Fig. 1, for the purpose presently to appear. In the rear of the plates 15 is a plate 18. It is manifest that for the plates 15, 16 and 17 there may be substituted a single plate with holes for the keys.

Voting keys 19, shown in Fig. 12, each consists of a bar rectangular in cross section having a body 20, a push-button 22, a shoulder 25, a locking arm 26 and the body terminating in a pointer 28, projecting from a shoulder or end A. This may be properly called a candidates' key as there is provided one key for each of the candidates on all of the party tickets. They are arranged in horizontal rows, each row representing a straight party ticket containing all of the candidates for all of the offices of any one party and they are set in rectangular openings in the plates 16 and 18 and said keys are arranged by offices in nearly vertical rows commencing near the plate 10 with each next lower key set further from the plate 10 by a trifle more than the thickness of the locking arm 26. The locking arm 26 of each key is of different length increasing from the upper key to the key at the bottom and hence, when the keys 19 are set, all of these arms extend upward side by side to a common horizontal plane above the topmost key and hence can not be conveniently set in a vertical line as shown in Fig. 5. All of these keys are mounted in the casings 15 and 18 and adapted for rectilinear reciprocation and constitute the voting keys of the machine.

All of the voting keys for each office in the various parties are preferably arranged in vertical rows with as many keys as there are party rows of tickets and all of the arms 26 of the keys for a given office are arranged collectively with a space between each office so that all of the arms of the keys for each office will be governed by a separate and independent lock for that office as herein-after to be described.

For voting a straight party ticket there is provided, in addition to the voting keys hereinbefore described, a straight party ticket key 20$^a$ one for each party, which consists of a body with shoulder 25 and a locking arm 26$^a$ practically the same as the voting key 19 but without the usual push bottom of the voting key. These are set in openings in casing plates 23 and 29 and adapted for rectilinear reciprocation but the ends of the keys do not project through the front plates of the machine and are therefore concealed from the voter at all times. All of the arms 26$^a$ of these straight party ticket keys extend upward to a common plane and each is adapted to engage and operate a fixed and an independent lock for these keys hereinafter to be described.

The initial act of an elector in casting his vote by this machine, is to advance to voting position an entire straight party ticket and the means by which this is accomplished is substantially as follows: Mounted horizontally and journaled for oscillation in bearings in the plates 5 and 6, are shafts 30, one for each party row of voting keys and straight party ticket keys. The shafts 30 projects outside of the casing 6 and are provided with a crank 31 for oscillating the same. Each of the shafts 30 is provided with a plurality of curved hooks 32, one for each voting key in a party row of keys and one for each straight party ticket key and these hooks are so arranged as to engage the shoulder 25 of the keys and when a shaft 30 is oscillated in one direction it will draw backward all of that party row of keys, including the key for the straight party ticket. It will be noticed that all of these hooks are so bent and attached to the shaft 30 that they will impinge against the center of the shoulder 25 and when the shaft is oscillated, these hooks will exert their force upon the shoulder 25 in a line parallel with the travel of the keys and hence there will be little friction in the movement of all of the keys of a party row.

Slightly in the rear of the uppermost shaft 30 is mounted a shaft 34 which runs longitudinally of the machine and is journaled for oscillation in bearings in the inner casings or plates 8 and 10. An arm 35 is secured to the shaft 34 by a collar 36 integral therewith and projects forward from the left end of the shaft and is bent at its outer end 38 so that the end of this arm will project into the space between the casings 6 and 10. A lever 40 fulcrumed on a pivot pin 44 at the lower forward corner of the plates 6 and 10 is pivotally connected to the forward end of the arm 35 by the connecting bar 42. This lever 40 is adapted to close up in between the plates 6 and 10 when the machine is not in use, as shown in Fig. 1.

To the right end of the shaft 34 is secured an arm 45 similar in construction and position to the arm 35. To the central portion of the arm 35 is pivoted a hanger 48 and to the lower end of the arm 45 is also pivoted a hanger 48. The hangers depend from the arms 35 and 45 and in their lower ends is mounted a shaft 50 which extends in a horizontal plane longitudinal of the machine.

Upon the shaft 50 are mounted all of the locks or tumblers 52, one for each separate office in the machine. If there be more than one candidate for an office as in the presidential electors office or commissioners office or any other collective office, then sufficient of these tumblers are coupled together until their combined length is a trifle more than the thickness of all of the arms 26 of all of the voting keys belonging to that office, whether single or collective. For instance, if there were 10 presidential electors, then there would be ten voting keys on each party and enough tumblers coupled together or a tumbler of sufficient length, to extend a trifle more than across the entire width of all of the arms of the voting keys for all of the parties. If it were a single office in which there is only one candidate in each party and there were seven parties then the single tumbler would be only of a trifle more in length than the thickness of the arms of the seven keys, one for each party. Each of the tumblers 52 is also provided with an arm 54 projecting upward therefrom and a weight 55 secured to said arm. Each of the tumblers is generally cylindrical in form, with a slot or groove 56 running longitudinally of the tumbler, whereby it may be more readily engaged by the arm 26, as will hereinafter more fully appear. The office or use of the bar 54 with the weight 55 is two fold, being for the purpose of advancing the voting keys to voting position if they have not been fully forced to voting position by either the shaft 30 or by manually operating the voting keys. The other office is to hold the tumblers in the position that they are placed by the engagement of the arms 26 with the tumblers and also hold them in position when the tumblers are operated in the opposite direction. These tumblers constructed and arranged in the manner described constitute the lock proper for the various offices in the machine.

For the purpose of positioning the tumblers whereby the grooves therein may be engaged and operated by the voting keys in voting position regardless of how they are left by the previous voters, there is provided a bar R for each tumbler having a slot S therein and said bar projecting through the perpendicular slot T in the front casing. Through the slot S projects the arm 54 of the tumbler 52 (see Fig. 7). When the tumbler is in its alternative position the arm 54 will have brought the other end of the bar R up to the register plate 95. It will be seen that if the elector should withdraw a voting key and refrain from voting for another candidate that when the register plate turns the voting keys to voting position, it will also, engage the end, of the bar R and push it endwise, causing the end of the slot S to engage the arm 54 and turn the tumbler over into position to be engaged by the voting keys brought to voting position by the next voter when he turns in a party ticket.

For the purpose of more readily directing the arms 26 into engagement with the slots 56 of the tumblers 52 and also preventing more than one arm from engaging said slot and operating the tumbler in one direction at the same time, and thus prevent voting for more than one candidate or set of candidates for one office, there is provided a check and a guide as herein after described.

There is mounted on and dependent from the shaft 50 by its upper part 62 a frame 68 which extends down beneath the tumblers 52 as shown in Figs. 9, 10 and 11. The frame 68 is provided with spacing partitions 64 and there are as many of these partitions as there are arms 26 in any vertical row of voting-keys for any one office and if there be more than one candidate for an office there would be as many more spaces as there would be vertical rows. The frame 68 is provided with shoulders 65 and bolted, by a bolt passing through the bolt hole 66, to a similarly spaced frame 68 and these separate frames when united together extend longitudinally from end to end of the machine in a horizontal plane beneath the row of tumblers 52.
The spacing plates or partitions 64 are spaced apart a trifle more than the thickness of the arm 26 so that the arm will travel in the space without friction, and above the middle of each plate there is an opening 70 through the plates of substantially an elliptical shape with rounded ends and a lug 72 projecting upward from the bottom of the opening. In these openings 70 are loosely set checks or buttons 74 of about the size of the openings 70 and provided with a notch 75 of substantially the shape of the lug 72 by which lugs the checks are guided in their movement through between the spacing plates 64 and the sum of the thickness of all the checks in any one frame 68, is equal to the sum of the thickness of all the spacing plates 64 and the spaces 63 less the thickness of an arm 26 and a trifle of clearance. This construction will permit one arm 26 and only one arm, to travel through the spaces 63 between the checks and enter and engage the lock at the same time. In Fig. 10 is shown a horizontal section of one of these frames 68 with all except one of the arms 26 on one side of the checks and one of the arms on the opposite side of the checks.

In order that the checks 74 may be held in yielding contact with each other, there is provided in the frame 68 and in the hanger 48 a recess 76 in which is placed a plug 78. Around this plug at the inner end is a flange 80 and between the flange and around the plug 78 is coiled a spring 82. The plug is at one end in contact with the check 74 and is held in contact by the spring 82 and when the arm 26 passes between any two of the checks the plug 78 will be forced against the inner end of the recess 76 in the hanger 48. Where the frames 68 extend entirely through the machine then there would be a similar arrangement at the opposite end of the frame 68, but these frames are preferably arranged in gangs with a recess 84 formed in each of the contiguous gangs of frames 68 and in this recess projects a plug 85 provided with a flange 86 which plug contacts with one of the checks 74 in the end of the frame 68. In the contiguous frame 68 is a plug 88 hollowed or recessed out to receive the plug 85. This plug 88 is also provided with a flange 89 and around the plug 88 is coiled a spring 90 which cushions against the flanges 86 and 89 and holds the plug 88 and 85 in contact with the checks in the contiguous frames 68. By this mode of construction of the frame and placing of the checks, only one arm can pass through between any two contiguous checks since it exhausts all of the clearance of all the checks in the frame for a given office, and hence only one arm can engage the lock at the same time.

It will be observed that the tumblers are situated over the checks 74 and just before the arm 26 is guided to the checks 74, it will engage the slot of the tumbler 52 and as it passes between the checks will partially rotate the tumbler and turn the tumbler in such a position that its slot 56 can not be engaged by any other arm and hence no other arm can pass through between the checks until the arm within the lock is withdrawn and the lock is brought to its normal or unlocked position. It will also be observed that these spacing plates and checks when set in the foregoing described relation to the lock, serve not only as guides to direct the arms 26 into engagement with the lock at the proper place, but prevent and preclude any other arm of any other voting key from entering or engaging the lock and hence there is no possibility of voting for more than the candidate or candidates for that office on one party ticket.

The means by which the vote is registered and the voting keys returned to normal or unvoted position is substantially as follows: In the rear of the machine is hung a register plate 95 (see Fig. 6) which consists of a sheet of metal of sufficient size to compass the ends of all the voting keys, and is provided with rectangular openings 96 arranged in the same plane with the keys 19 and adapted to receive the points 28 of the keys. At the outer side of this plate 95 and contiguous to each opening 96 is secured a register 100 by the screws 98. The registers are each provided with a register or pin wheel 102 having the arms or pins 104 over the openings 96. To the upper and lower edges of the register-plate 95 is secured a bar 105, in the ends of which are secured pins or studs 106 which project beyond the edges of the plate through rectangular openings 108 in the casings and each is provided with a roller 110 adapted to travel in the openings 108. At a short distance from the openings 108 is cut in the casing a perpendicular opening 112. Against the outside of the casings 8 and 10 is placed a lever plate 114, which plate is provided with diagonal openings or slots 115, one near each end and also with slots 116 parallel with the body of the plate. Through the slots 116 and the corresponding slots or openings 112 in the casings, the plate 114 is slidingly attached to the casings by the bolts 118. To the upper end of the plate 114 is pivoted a link 120, and to the upper end of this link is pivoted a lever 132. The lever 132 is fulcrumed on a pivot pin 134 fixed in the casing. The outer end of the lever 132 is provided with a pin 135 which projects through a slot 136 in the casing and to it is secured one end of a weight

138. To the lower end of the plate 114 is pivoted another link 140 by a pivot pin 139 and to the outer end of this link is pivoted a bell-crank 142 by the pivot pin 141. This crank 142 is rigidly fixed upon a shaft 144 that runs longitudinally through the machine and is journaled in the partitions 8 and 10. To the other end of the crank is secured a pin 145 which passes through a slot 146 in the casings and to it is pivoted a pawl 143. Upon the other end of the shaft 144 is fixed another bell-crank 149 to which is pivoted a duplicate arm 140 and plate 114 with its attachments. To the bell-crank 149 is loosely attached a chain 147 by a pin 151. This chain extends out over the link 140 between the ends of the casing and is secured to one side of the cam shape exit lever 148. This lever is provided with an operating arm or handle 150. The mode of operating this part of our device whereby the vote is registered, is substantially as follows: After the elector has indicated the different candidates he has chosen, he passes out of the machine at the right end and at the same time partially turns the exit lever arm 150. This movement partially rotates the cam 148 which causes the roller 47 to travel up the incline 148$^b$ and raises the hanger 48 and with it all of the locks and the connections therewith, and at the same time draws the chain 147 attached to the bell-crank 149. This draws down link 140 which also draws down the plate 114 and as the registering plate 95 is pivoted in the openings 108 and slots 115, there will be given a perpendicular movement to the register-plate 95 and, as the ends of the voting keys project into the openings 96 in the plate, the perpendicular movement of the plate 95 will cause the points 28 of the voting keys to engage one of the pins of the pin wheels 104 and move it sufficiently to register the vote. It will also bring down link 120 of the lever 132 and raise the weight 138 and as the rollers 110 are in the openings 108 and 112, the registering plate will be given first a perpendicular movement to register the vote and then a horizontal movement, whereby the plate 95 will engage the inner shoulder A of the voting keys and restore them to normal or unvoted position. After the elector has passed out of the machine he turns back the lever arm 150, which releases the draft of the chain 147 on the bell-crank 142 and permits the weight 138 to come into action and draw up the plate 114, which moves the register plate first in a horizontal plane backward and then the plate is raised in a perpendicular plane to its normal or unregistering position.

It will be observed that on account of the diagonal slots 115 and the vertical slots 116 in the plates 114 and the right angle slots 108 in the casing, that when the movement of the plates 114 is downward the movement of the register-plate, since it travels in the slots 108 and 115, will be perpendicular then at right angles horizontally, and when the plates 114 are moved upward the first movement of the register plate will be on a horizontal plane and then at right angles in a perpendicular plane to its original or normal position.

For the purpose of restoring the straight party ticket keys 20$^a$ to their normal or unvoted position after they have been actuated, there is provided a plate 95$^a$ similar to plate 95 but without any openings. This plate 95$^a$ is set between the casings 6 and the partitions 10 and is secured to blocks 95$^b$, one at its upper and the other at its lower corners. The pins 106 project through the casing 10 and into the blocks 95$^b$ and upon these pins is rigidly secured the plate 95$^a$. When therefore the plate 95 restores the voting keys to their unvoted position the plate 95$^a$ will also restore the straight party ticket keys to their normal position since the plate 95$^a$ is given the same movement as the plate 95.

It will be understood that the locks guides and checks for each office that pertains to and lock the candidate or voting keys, are lowered to operative position when the elector raises the entrance lever to enter to the face of the machine and these locks are raised out of operative position when the elector operates the exit lever which lowers the entrance lever as he passes from the machine. The manner in which this is accomplished whereby the entrance lever and the exit lever are connected together and the locks, guides etc. are raised and lowered is as follows: Referring to Figs. 3, 4, 8 and 14, as before stated, the entrance lever 40 is connected by a bar 42 to the bent portion of the arm 35, and that from the central portion of the arm 35 is pivoted a hanger 48 and also at the exit end of the machine a similar hanger 48 is pivoted to the arm 45. In these two hangers 48 is mounted the shaft 50 upon which all of the locks or tumblers for the various offices are mounted and also from this is suspended the spacing frames 68 through their upper ends 62. The hanger 48 extends downward in the guide 49 and to the lower end is pivoted the roller 47 shown in Fig. 14, having a beveled face which rides on the cam face 148$^b$ of the wheel 148 which is journaled in the brackets 137. The wheel is returned to normal position after having been operated by means of the weight 138 as herein described. One edge of the wheel 148 is recessed out at 148$^a$ and in the recess is a pin 141, to which pin 141 is attached a chain 147 connected with the bell-crank 149, and is connected with the weight 138, through the plate 114 and attachments and to the wheel 148 is attached also the exit lever 150.

It will be seen that when the entrance lever is down that the locks, guides and guide frames are sufficiently raised so that all of the checks are above the top of all of the arms 26 and out of engagement with the tumblers, and when the elector raises the entrance lever to pass to the face of the machine it draws down the arm 35 and lowers the shaft 50 and with that shaft all of the tumblers thereon, together with the guide frames 68; then as the elector passes out from the machine he seizes the handle of the lever 150 which is attached to the wheel 148 and as he turns around the handle to pass out he partially rotates the wheel 148 by the connection of the bell-crank 149 and the chain 147 and as it rotates the wheel 148 the roller 47 travels upon the incline 148$^a$ and raises the hangers 48 which carries up the shaft 50 and with it, the locks or tumblers, guides and checks out of operative relation with the arms of the voting keys and the same movement lowers the entrance lever to its normal position and the exit lever is turned to its normal position by action of the weight 138 through its connections.

In a collective office or in an office where there are numerous candidates for the same office on each party ticket, such as the presidential electors or a plurality of judges, if the elector desires to vote for one or more candidates and not for the balance of the candidates there is provided canceling keys 21 as many as there are candidates on any one party ticket for this office, these canceling keys have thereon an arm 176, the same as the voting keys and extend to a position where they can engage the groove in the tumbler 52 and operate the tumbler whereby the voting keys in normal position can not be moved to voting position, but any key for this office that is in voting position may be moved to normal position. As has been before stated after the elector has thrown in the full party ticket to voting position by movement of the crank 31 to rotary oscillate the shaft 30, he raises the entrance lever 40 which lowers the guides and the lock and then passes to the face of the machine. If he now desires to cancel any one or more of the candidates on the straight party ticket he has just brought to voting position and not substitute any other candidate whose name appears upon the face of the machine for the candidate he desires to exclude, there is provided a set of canceling keys 21 below the regular party row of keys as shown in Figs. 1 and 13, which consists of a body 175 and an arm 176. Over the outer end of the body 175 is a cover or plate 177 provided with an arm 179 and with a shoulder 181. This cover with the push button 178 at the end slides over the top of the body 175 and extends to the arm 176 and the arm 179 extends downward at right angles to the cover of the body 175. The body is adapted to be reciprocated in the plates 15 and 18 the same as the regular voting keys and is of the same length except the points 28 are not on any of these keys. The manner of operating this canceling device is substantially as follows: if the elector desires to cancel his vote for any candidate that he has brought to voting position, he withdraws the voting key that he has turned in for that candidate, then pushes in the canceling key for that same office and this prevents him from voting for any other candidate for that office whose name appears on the face of the machine because, when the canceling key is pushed in, the arm 176 engages the slot 56 and oscillates the tumbler backward and puts it in such a position that no other voting key for that office can be pushed in.

It will be observed that the elector can not withdraw the canceling key after he has once pushed it in, since the cover with the push button attached thereto is not connected in any manner with the canceling key. The cover can only be drawn out until the shoulder 181 on the cover comes in contact with the front plate 15, but the outward movement of the cover in no manner affects the movement of the canceling key. Since the canceling key projects in the rear to the same distance as the shoulder on the regular voting keys and when the voting keys are restored to their normal position by the register plate coming in contact with the other shoulders, it will also come in contact with these canceling keys and restore them to their normal position. It will be seen that it is necessary we should have these canceling keys, for should any elector desire to withdraw two or more of the voting keys in a collective office and refrain from voting for any of the other candidates for this office it is necessary that other means be provided to accomplish this result, he can withdraw one of the voting keys but in doing it the arm on the key enters the groove in the tumbler and oscillates the tumbler into a position that no other key for this office that is in voting position can be withdrawn, and as these collective offices will appear on different parts of the machine each election there is provided a row of these keys which we call canceling keys. The work or office of these keys is to oscillate the tumbler governing said key or keys to such a position that any voting key in said office that is in voting position may be withdrawn to normal position but any key in normal position can not be moved to voting position through or by any action of the canceling key. It is to be understood that in operating the office locks the voting keys and canceling keys pass through and beyond said locks and after operating the same they are not connected to or in engagement with or form any part of said locks.

In order that the elector may exercise his franchise at pleasure and vote for one or more candidates not on any of the straight party tickets there is provided a table 182 extending longitudinally along the front of the keys below the last row. In front and slightly above the table is a plate 180 and in the rear of the table 182 another plate 189 both extending longitudinally of the machine and parallel with the table. Upon the plate 189 is a row of small plates 184 which are hinged together by pins passing through their ears 183 at each corner of the plates 184 and said plates 184 extend across the table 182 to the plate 180. Below the keys is pivoted a roller 185 which is provided at its outer ends with ratchets 186. Beneath the plate 180 and the plates 184 are pivoted two rollers 188 practically in the same plane and between these rollers and lower down is journaled a larger roller 190. The roller 190 carries a roll of paper 192 which passes from the roller 190 up over the rollers 188, the table 182 and is secured to the roller 185. In the casing is pivoted a pawl 194 adapted to engage the ratchet 186 upon the roller 185 in the base of the roller, and another pawl 143 pivoted to the crank-arm 149 by the pivot pin 145 is set to engage the ratchet 186 upon the upper side of the roller 185. The manner of operating this part of our device whereby the voter may vote for any one not on any party ticket for any office he has not already voted for, or for any one in any office he has canceled, is substantially as follows: When the elector has pushed in the canceling device by the push button 178 and prevented him from voting for any other candidate for that office or in other words finished scratching the party ticket turned in, he raises one of the plates 184 underneath the candidates' row and writes the name of any party he chooses upon the sheet 192 resting on the table 182 and then drops the plate 184 over the writing. If he finds he has made a mistake and written the wrong name or the name he did not intend, the elector can again raise the plate 184 and scratch out the name he has written and substitute another name. This vote upon the paper 192 is removed from over the table 182 and wound on the roller 185 by the action of the exit lever operating the crank arm 142, forcing the pawl 143 against the ratchet 186 and partially rotating the roller 185 by the same action that records the other vote.

It will be observed that the elector can change his vote for an independent candidate at pleasure as the plates 184 are not governed by or locked or attached to any operating part of the machine, but can be raised at pleasure and fall back by their own gravity, neither do they govern or control any operative part of the machine.

All of the mechanism necessary for voting and preventing fraud relative thereto has now been described, and the operation of voting is as follows: The elector approaches the end of the machine having the levers with the different political parties named thereon, and selecting the lever having the name of the political party he wishes to vote for, he moves it till it strikes a stop, such movement of lever 31 oscillates shaft 30 and causes the curved hooks 32 to engage with the shoulders 25 of the voting keys 19 including the key $20^a$ for the straight party ticket and said movement causes the straight party ticket key and all of the candidate keys on this party ticket to move rearwardly and the candidate keys to voting position, this same movement has also caused the arm $26^a$ of the straight party ticket key $20^a$ to engage the groove $68^a$ of the tumbler $52^a$ and turn it to the opposite position thereby locking all the straight party ticket keys. The elector then raises the entrance lever 40 and in so doing lowers the tumblers, spacing plates, checks and associate devices. The entire row of arms 26 on the voting keys moved rearwardly as described across the vertical plane of the tumblers 52 and checks 74 and in the descent of the spacing plates and tumblers, said arms are received between the rear portions of the spacing plates and with their upper ends above the horizontal plane of the lowermost portions of the tumblers. No other straight ticket can be voted, because when one of the straight ticket keys $20^a$ is moved rearwardly by the hook 32 to engage the shoulder $25^a$ it turns the tumbler $52^a$ into the opposite position whereby it cannot be engaged and rotated by any other arm $26^a$ on the straight party keys and no other candidates' key can be moved rearward because of the lock interposed by one or the other of the tumblers (positioned by prior recorded vote) preventing passage of the arm 26 on said key to the rear. This tumbler lock is interposed by oscillation of each tumbler, by the judge of election in preparing the machine for voting or by previously recorded vote, in such manner that the groove 56 of each tumbler is directed rearward and can not be entered by the end of the arm 26 on the key desired to be fraudulently voted. No two keys can be moved at the same time (when the locks are in this position) because the checks 74 will not permit two arms 26 to pass through at the same time.

If the elector desires to vote a mixed ticket or "scratch" his party ticket and vote for some other candidate whose name appears on the face of the machine after he has turned in the full straight party ticket, he draws out the key which carries the objectionable candidate's name for a given office and pushes in the key for the candidate he wishes to vote for but he must first pull out the key before he can push another in, because when he pulls out the key that is in voting position, its arm 26 enters the groove in the tumbler and oscillates the tumbler into position to allow the arm of any key for that office that is in normal position to enter the groove in the tumbler and oscillate it back again into position to be engaged by the arm on some other key for that office, and in this manner by pulling out one of the keys and pushing in another he can "scratch" his ticket at will, not only in the offices which have a single candidate for each party but in a collective office where there are numerous candidates. If he finds that he does not want to vote for any one for a given office, he can cancel that office by pulling out the key brought to voting position, and pushing in a canceling key as herein-before described, or if he desires to cast an independent vote for a candidate whose name does not appear upon the face of the machine, if he has canceled the vote for any office, he can then lift up one of the plates 184 and write the name of the candidate he desires upon the sheet, as herein-before described. After the elector has made all of his selections and indicated the candidates he desires to vote for, he passes from the front of the machine and moves the exit lever 150 to the rearward and passes away from the machine and then by the means as herein-before described the vote is recorded, and all of the keys together with the register-plate are restored to their normal position at the same time the entrance lever is lowered and the locks together with the plates and checks are raised out of operative position and the machine is ready for the action of another voter.

Having now described our invention what we claim is:

1. In a voting machine, a voting key, a movable register plate, a register secured to the register plate, means for moving the register plate to cause the register to be engaged by the end of the voting key and operate the register to record the vote, and means for restoring the key to unvoted position by direct contact of the register plate with the voting key.

2. In a voting machine, a voting key, a movable register plate, a register attached to the register plate, and means for moving the register plate to cause the register to contact with the end of the voting key for recording the vote and by the movement of the register plate parallel with and against the key to restore the key to normal or unvoted position.

3. In a voting machine, a voting key, a register plate, a register secured to the register plate, pins on the register, means for moving the register plate to cause the end of the voting key to engage the pins of the registers and operate the register to record the vote, and means connected with the register-plate to cause the register plate to engage the key and restore the key to normal or unvoted position.

4. In a voting machine, a voting key, a register plate, a register secured to a register plate, means for moving the register plate to cause the end of the voting key to engage the register and operate the same, and means to bring the register plate into engagement with the voting key to restore the voting key to its normal or unvoted position, and by the same means restore the register plate to normal or unregistering position.

5. In a voting machine, providing for a plurality of offices, a row of voting keys, a row of locks one for each office provided with a tumbler adapted to be separately and rotarily oscillated without the movement of any other tumbler by all of the voting keys for a given office at times, and an entrance lever for bringing the lock into position to be operatively engaged by the voting keys for that office after the voting keys have been brought to voting position.

6. In a voting machine, a row of voting keys one for each candidate in each office, a lock one for each office consisting of an individual and independent tumbler mounted for rotary oscillation, an arm on each voting key and all of the arms for all of the keys for a given office adapted to engage the same tumbler and rotarily oscillate it without oscillating any other tumbler, and an entrance lever for bringing the locks into position to be operatively engaged by the arms on the voting keys after the voting keys have been brought to voting position.

7. In a voting machine, a series of voting keys, an arm integral with each key and all the arms of any one series of the same length and in different series of different lengths and all the arms of all the series projecting to a common plane, a series of locks normally out of engagement with the voting keys, means for bringing the locks into position to be operatively engaged by the voting keys after the keys have been brought to voting position, a movable register plate carrying registers, and means for moving the register plate to cause the registers to engage the ends of the voting keys and record the vote.

8. In a voting machine, a series of voting keys, an arm integral with each key and all the arms on any one series of the same length and of different series of different lengths and all the arms of all the series projecting to a common plane, a series of locks one for each office normally out of engagement with the voting keys, means for advancing the voting keys to voting position without operating any of the office locks, means for bringing the office locks into position to be operatively engaged by the voting keys after the keys have been brought to voting position, a movable register plate carrying registers, means for moving the register plate to cause the register to engage the ends of the voting keys and record the vote, and means for restoring the voting keys to normal position by direct contact of the register plate with the voting keys.

9. In a voting machine, a casing, a movable lock consisting of a tumbler mounted for rotary oscillation, a voting key mounted to slide in the casing, an arm on the key adapted to engage the tumbler and rotate it, movable guides consisting of spacing plates independent of the bearings of the voting key for directing the arm on the key into engagement with the tumbler, and an entrance lever for lowering the lock and guides to operative position.

10. In a voting machine, a movable lock consisting of a tumbler provided with a longitudinal groove therein and mounted for rotary oscillation, a voting key, an arm on the voting key adapted to engage the groove in the tumbler and rotate the tumbler, and an entrance lever for lowering the tumbler to a position where it can be engaged by the arm on the voting key after the voting key has been brought to voting position.

11. In a voting machine, a movable lock consisting of a tumbler mounted for rotary oscillation and provided with a groove, a voting key, an arm on the voting key adapted to engage the groove in the tumbler and operate the tumbler, a movable guide consisting of spacing plates disconnected from the bearings of the voting keys, and an entrance lever for raising and lowering the tumblers and guides, substantially as and for the purposes shown.

12. In a voting machine, a movable lock consisting of a tumbler mounted for rotary oscillation and provided with a groove, a voting key, an arm on the voting key adapted to engage the groove in the tumbler and operate the tumbler, a movable guide consisting of spacing plates separate from and independent of the bearings of the voting keys, a movable button between the spacing plates, and an entrance lever for raising and lowering the tumbler, guides and button.

13. In a voting machine, a row of voting keys one for each candidate in each office, a lock one for each office consisting of an individual tumbler mounted for rotary oscillation, an arm on each voting key integral therewith and all of the arms for all of the keys for a given office adapted to engage the same tumbler and rotarily oscillate it at times, and an entrance lever for bringing the locks into position to be operatively engaged by the arms on the voting keys after the voting keys have been brought to voting position.

14. In a voting machine, a series of voting keys, a series of locks one for each office consisting of a tumbler mounted on a shaft for rotary oscillation and normally out of engagement with the voting keys, means for moving the keys to voting position, means for bringing the locks into position to be engaged by the voting keys after the voting keys have been brought to voting position, a movable register plate carrying registers, and means for moving the register plate to cause the registers to contact with the ends of the voting keys and record the vote.

15. In a voting machine, a voting key, a lock, a movable register plate, a register secured to the register plate, means for imparting to the register plate first a perpendicular movement to cause the register to engage the end of the voting key and operate the register and a horizontal movement for returning the voting key to its normal position after operating the register to record the vote and a reverse movement to restore the register plate to its normal position.

16. In a voting machine, a voting key consisting of a body and an arm integral with the body, a movable lock normally out of position to be operated by the arm on the voting key either when the voting key is in normal or in voting position said lock operated by the arm of the voting key, means for moving the lock into position to be engaged by the arm on the voting key when the key is moved to voting position, a movable register plate provided with a slot therein, a register attached to the movable register plate in proximity with the slot, and means for moving the register plate to bring the register into engagement with the end of the voting key and operate the register to record the vote.

17. In a voting machine, a series of party rows of voting keys, a lock for each series operated by a straight party ticket key, a movable register plate, registers upon the register plate for all of the party rows, means for moving the register plate to bring the registers into engagement with the ends of the voting keys to operate the registers, means attached to the register plate for restoring the voting keys to their normal position after operating the registers, and means attached to the register plate for restoring the straight party ticket key to normal position by contact with the end of the party ticket key operated.

18. In a voting machine, a voting key, a lock operated by the voting key, a register plate provided with slots or openings therethrough, a register for each opening, means for moving the register plate in a perpendicular direction to cause the register to engage the end of the voting key and operate the same, and means for restoring the voting key to normal position by engagement of the register plate with the voting key after operating the register and the register plate to normal position.

19. In a voting machine, a voting key, a movable register plate, a register secured to the register plate, and means for imparting to the register plate first a perpendicular movement to cause the register to engage the end of the voting key and record the vote and then a horizontal movement to bring the register plate into engagement with the key and restore the key to its normal or unvoted position.

20. In a voting machine, a voting key, a movable register plate, a register secured to the register plate, means for imparting a perpendicular movement to the register plate to cause the register to engage the end of the voting key and record the vote and then a horizontal movement to bring the register plate into engagement with the key and restore the key to its normal or unvoted position, and means attached to the register plate for restoring the register plate to its normal or unregistering position.

21. In a voting machine having a plurality of offices, a series of party rows of voting keys, a lock for each office, a register plate, a register for each candidate on the party rows secured to the register plate, means secured to the register plate for causing the registers to engage the ends of the voting keys and operate them to record the vote, and means attached to the register plate to cause the register plate to restore the voting keys to normal or unvoted position by direct engagement with the keys.

22. In a voting machine, a voting key, a lock operated by the voting key and normally out of operative relation with the voting key, a register plate, a register secured to the register plate, means for imparting movements at an angle to each other to the register plate for operating the register and restoring the voting key to unvoted position by its engagement with the voting key, and means for restoring the register plate to its normal position after operating the register and restoring the voting key to its normal position by contact of the register plate with the voting key.

23. In a voting machine, a casing, a row of movable locks each consisting of a tumbler mounted for rotary oscillation, a series of voting keys each provided with an arm adapted to engage the lock and all the arms of one series of the same length and in different series of different length and all the arms of all the series extending to the same plane, guides for directing the keys into engagement with the tumblers and the lock consisting of spacing plates separate from the bearings of the keys in the casing, means for preventing more than one key from entering or engaging the lock consisting of buttons within the spacing plates, and an entrance lever for bringing the locks, guides and buttons into operative relation with the arms on the voting keys.

24. In a voting machine, a casing provided with slots or openings therein, voting keys, a plate provided with slots therein slidingly secured to the casing, a register plate provided with means for engaging the slots in the casing and plates and travel therein, and means for moving said register plate in said slots to cause the registers to engage the ends of the voting keys and record the vote.

25. In a voting machine, a casing provided with slots or openings therein, a voting key, a plate provided with slots therein slidingly secured to the casing, a register plate provided with means for engaging the slots in the casing and plates and travel therein, and a lever attached to one of the plates for operating the plates to move the register into contact with the voting key to register the vote.

26. In a voting machine, a casing provided with openings or slots therein, a voting key, plates provided with slots therein slidingly secured to the casing, a register plate provided with means to engage the slots in the casing and plates and travel therein, means attached to the plates for moving the register plate to cause a voting key to be engaged by the register and record the vote, and means connected with the plates for restoring the key and register plate to unvoted position.

27. In a voting machine, comprising a plurality of series of party rows of voting keys, a plurality of key actuating devices whereby a straight party ticket may be brought to voting position, a lock for the straight party ticket, and means for locking all of the key actuating devices except the one actuated consisting of a key for each party row, an arm integral with each key adapted to engage the lock and operate the same, and a plate connected to the register plate for restoring the straight party ticket keys by direct contact with the ends of the keys.

28. In a voting machine, comprising a series of party rows of voting keys, a series of key actuating devices whereby a straight party ticket may be brought to voting position, a lock, and means for locking all of the key actuating devices except the one actuated consisting of a key for each party ticket, an arm on each straight party ticket key adapted to engage the lock and operate the same, a movable register plate, and means on the register plate adapted to engage the ends of the straight party ticket keys and restore them to normal position when the register plate restores the voting keys to normal position by contact with the keys.

29. In a voting machine, comprising a series of party rows of voting keys, a series of party ticket keys, a series of party row actuating devices whereby a straight party ticket may be brought to voting position, means for locking all of the vote key actuating devices except the one actuated consisting of a tumbler adapted to be actuated by means attached to a straight party ticket key, in combination with a movable register plate, and means connected therewith adapted to engage and restore the party ticket key to normal position when the register plate restores the voting keys to normal position.

30. In a voting machine, a series of straight party ticket keys, an arm on each key, a lock, means for actuating a key to cause its arm to engage the lock and lock all of the actuating devices of the party rows of keys except the one actuated, in combination with a series of rows of voting keys one row for each party, means for advancing simultaneously each row of voting keys to voting position including the advancement of a party ticket key to operate its lock, a registering device, and means for bringing the registering device into engagement with the ends of the voting keys to record the vote.

31. In a voting machine, a series of straight party ticket keys each provided with an arm, a lock common to the arm of all of the series, means interposed in the path of the travel of the arms of the keys to prevent more than one key from engaging and operating the lock at the same time, a series of rows of voting keys, a series of actuating devices for actuating the arms on the straight party ticket keys to engage the lock and at the same time engage the voting keys to move them to voting position and registers adapted to be operated by engagement with the ends of the voting keys.

32. In a voting machine, a plurality of straight party ticket keys one for each party, a lock common to all of said keys, means for actuating any one of said keys to engage and operate said lock and thereby prevent any of the rest of the keys from operating said lock, a series of party rows of voting keys, a series of key actuating devices whereby the voting keys of a party ticket may be brought to voting position and at the same time the party ticket key of said party will be brought to engage and operate the party ticket lock, a movable register plate, and means connected to said plate adapted to engage and restore said party ticket key to normal position by contact with the end of the key when the register plate restores the voting keys to normal position by contact with the keys.

33. In a voting machine, a series of voting keys, a lock one for each office, a register plate carrying registers, and means operated by the register plate for engaging the office locks and operating them only in one direction without moving the voting keys, whereby all of the locks may be turned to normal position.

34. In a voting machine, a voting key, a lock consisting of a tumbler mounted for rotary oscillation, a movable register plate carrying registers, and means connected with the lock and adapted to be engaged by the register plate to rotate the tumbler to normal position without moving the voting keys.

35. In a voting machine, a voting key, a lock consisting of a tumbler mounted for rotary oscillation, a movable register plate carrying registers, means slidingly secured in the casing adapted to be engaged by the register plate, and means for operating the register plate to engage the sliding means and oscillate the tumbler to normal position without movement of the voting keys.

36. In a voting machine, a series of voting keys, a lock one for each office, and normally out of engagement with the voting keys, guides for directing the keys into engagement with the lock, means interposed between the guides for preventing more than one key from entering the lock at the same time, said means normally out of engagement with the voting keys, and an entrance lever connected with the locks and guides for lowering the interposed means to a position whereby the guides will guide the keys into the locks and at the same time lower the locks into a position whereby they may be engaged by the voting keys while passing between the guides and interposed means.

37. In a voting machine, a series of voting keys, a lock one for each office normally out of engagement with the voting keys, guides for directing the keys into engagement with the lock consisting of spacing plates disconnected from the bearings of the voting keys placed in operative relation with the locks, buttons interposed between the guides for preventing more than one key from entering and operating the lock at the same time, and an entrance lever connected with the locks and guides for lowering the guides and buttons to a position whereby they will guide the keys into the locks and at the same time lower the locks into position whereby they may be engaged by the voting key.

38. In a voting machine, a voting key, means for advancing the key to voting position, a lock, a canceling key consisting of a body, an arm integral therewith, a push button, and means connected with the push button for forcing the arm on the canceling key into engagement with the lock to operate the lock and force the arm out of and away from the lock.

39. In a voting machine, a movable lock, a voting key adapted to engage and operate the lock, a canceling key consisting of a body, an arm integral with the body, a push button, means connected with the push button and disengaged from the body of the key and adapted when the push button is manually forced in one direction to engage and carry with it the canceling key and when the push button is withdrawn the body and arm of the key will remain in its forced position, and an entrance lever for lowering the lock into position to be engaged by the canceling key.

40. In a voting machine, a movable lock consisting of a tumbler mounted for rotary oscillation, a canceling key consisting of a body, an arm integral with the body, a push button disconnected from the body and provided with means for engaging the body when the push button is manually forced in one direction to engage the body of the key and cause the arm on the body to engage the tumbler and oscillate it, and an entrance lever for bringing the tumbler into position to be engaged by the canceling key.

41. In a voting machine, a plurality of voting keys each provided with an arm integral therewith, a movable lock consisting of a tumbler mounted for rotary oscillation, in combination with a canceling key consisting of a body provided with an arm integral therewith, a push button, means connected with the push button to engage the arm on the key and when the push button is manually forced against the arm said arm engages the tumbler and oscillates the tumbler and then passes out and away from the tumbler leaving the tumbler in its oscillated position, and an entrance lever for bringing the tumbler to a position to be engaged by the arm on the canceling key.

42. In a voting machine providing means for voting for the candidates in a collective office, a plurality of voting keys, a single lock common to all of the voting keys for that office consisting of a tumbler adapted to be rotary oscillated by the voting keys and normally out of operative position with the voting keys, a plurality of canceling keys provided with means for engaging and rotating the tumbler of the lock and become disengaged from the lock, and an entrance lever for bringing the lock into position, whereby it may be engaged by the voting keys already brought to voting position and also be engaged by the canceling keys when the voting keys have been returned to unvoting position.

43. In a voting machine, a voting key, a lock consisting of a tumbler mounted for rotary oscillation normally out of engagement with the voting key, a canceling key provided with an arm integral with the key and adapted to oscillate said tumbler, a push button, means connected with the push button to engage the arm on the canceling key when the push button is manually operated to force the arm against the tumbler and rotary oscillate it and then pass away from the tumbler, and an entrance lever for lowering the lock to a position where it can be oscillated by both the voting and canceling key at times.

44. In a voting machine, a row of voting keys, a lock one for each office, consisting of a tumbler mounted for rotary oscillation and normally out of engagement with the voting keys, a row of canceling keys adapted at times to engage the tumbler of the lock and operate it and then pass out and away from the lock, a traveling sheet, cover plates over the sheet and disconnected from any operative part of the machine which may be raised to uncover the sheet without operating any part of the machine and means for moving the sheet.

45. In a voting machine, a series of movable locks, each lock consisting of a tumbler adapted to be rotary oscillated, a series of vote keys each provided with an arm and all of the arms of the same series of the same length and of different series of different lengths and all of the arms of all of the series extending to a common plane, a row of canceling keys, each provided with an arm projecting to the same plane with the arms on the voting keys, an entrance lever for lowering the tumblers or locks into a position whereby they can be rotated by the arms on both the voting and canceling keys, a movable sheet, a row of plates covering the sheets and disconnected from any of the operative parts of the machine, and means for advancing the sheet by its connection with the exit lever.

46. In a voting machine providing for a plurality of offices and a plurality of candidates for the same office, movable locks one for each office said locks each consisting of a tumbler adapted to be rotary oscillated one at a time without causing the movement of any other tumbler in the row, voting keys each provided with an arm adapted to engage and rotate the tumbler, a plurality of canceling keys each provided with an arm adapted to engage and rotate the tumbler, a traveling sheet, cover plates over the sheet hinged to the machine but disconnected from any operative part of the machine, and means for advancing the sheet.

47. In a voting machine, a series of voting keys, a series of canceling keys, a row of office locks normally out of operative relation with said keys, means for moving the voting keys of a party ticket to voting position, means for moving the locks into position to be operated by the voting keys in voting position, means for operating the locks by the canceling keys, means for manually moving the canceling keys to operate the locks, and means disengaged from the canceling key consisting of a sliding cover over its forward end for engaging the arm on the key to force in the key to operate the lock.

48. In a voting machine, a series of locks each consisting of a tumbler mounted for rotary oscillation, a series of vote keys, a series of canceling keys, means for raising said locks out of and lowering said locks into operative relation with said keys, means whereby a canceling key at times may be manually moved to operate and pass away from any connection with its lock, a movable sheet, a plate over the sheet disengaged from any operative parts of the machine adapted to be raised to give the elector the opportunity for writing a name on said sheet and means for advancing the sheet to cover said name.

49. In a voting machine, a series of vote keys, a series of canceling keys, a row of office locks one for each office, each independent of the other and mounted for rotary oscillation and normally out of operative relation with said keys, means for moving the vote keys of a party ticket to voting position without said keys operating or causing said locks to be operated, means to prevent more than one key operating the locks at the same time consisting of a plurality of plates or guides one for each key, a plurality of pawls or buttons yieldingly held in said guides said buttons normally out of operative relation with said keys, and means for moving the office locks, guides and buttons into operative relation with said keys, whereby any one key that has been brought to voting position will operate its lock when being moved to normal position and the canceling key for this office or any vote key for the office that is in normal position may operate said lock.

50. In a voting machine, a series of vote keys, a series of canceling keys, a row of office locks each independent of the other, mounted for rotary oscillation and normally out of operative relation with the vote and canceling keys, means for moving all of the vote keys on a party ticket to voting position without any of said keys operating said office locks, means for moving said office locks into position to be engaged and operated by the vote keys that have been moved to voting position whereby the vote keys are disconnected from said locks and form no part thereof, means for operating said locks to a position whereby a canceling key can be manually moved to operate one of said locks and become disconnected therefrom, a movable sheet, a plate over the sheet, that has no connection with any movable part of the machine adapted to be raised to allow the elector to write on the movable sheet, means for advancing the movable sheet to conceal the names, means for moving the office locks out of operative relation with the vote and canceling keys, means for restoring the vote and canceling keys to normal position, and means for operating the locks independent of the vote or canceling keys.

51. In a voting machine, the combination with a plurality of vote keys, a plurality of canceling keys, a plurality of series of key actuating devices adapted to move the vote keys of a party ticket to voting position without operating the office locks, a row of rotary oscillating office locks one for each office normally out of operative relation with both vote and canceling keys adapted to be moved into operative relation with said keys, an entrance lever adapted to move said office locks into operative relation with said keys to prevent all of the vote keys in normal position being moved to voting position, means to operate the locks whereby any of the vote keys may 160 be moved to voting position, a plurality of guides or plates holding a plurality of buttons adapted to prevent more than one key operating the locks at the same time, a register plate provided with slots, a plurality of registers secured to the register plate, plates connected to the register plate and movably attached to the casings adapted to move the register plate to cause the registers to contact with the end of the vote keys to record the vote and to move the office locks out of operative relation with the keys to cause the register plate to engage the keys and restore them to normal position, an exit lever with its connections adapted to move said movable plate to restore the register plate to normal position, a movable roll of paper a series of cover plates over the paper, each plate independent of and not connected to any movable part of the machine adapted at times to be raised to expose the paper, means adapted to move the paper to conceal the names on the paper, and means for restoring the exit lever to normal position whereby the machine is unlocked and ready for use, substantially as shown.

52. In a voting machine, a plurality of series of vote keys, a series of canceling keys, a plurality of series of key actuating devices: a series of office locks each independent of the other normally out of operative relation with any of said keys, means for moving all the vote keys on a party ticket to voting position without any of said keys operating said office locks, means for moving said office locks into position to be engaged and operated by the vote keys that have been moved to voting position, means for operating the locks to be engaged and operated by the canceling keys, a register plate, a plurality of registers one for each vote key secured to said register plate, means for moving the register plate to cause the registers to engage the ends of the vote keys to record the vote, means for restoring both vote keys and canceling keys to normal position by direct contact of the register plate with said keys, a movable sheet, a plate over the sheet, said plate disconnected from any movable part of the machine and adapted to be raised to allow the elector to write on the movable sheet, means for advancing the movable sheet to conceal the writing, means for operating the office locks in one direction only independent of the vote and canceling keys, and means for moving the office locks out of operative relation with the vote keys and restore the register plate with the registers thereon to normal or unregistering position consisting of the exit lever with its connections, substantially as shown and described.

53. In a voting machine, a party row of voting keys each key adapted to be reciprocated, a movable register plate, a counter for each key secured to the register plate, means for bringing the counters into direct engagement with the ends of the reciprocated keys to record the vote, and means for restoring the keys to unvoted position by contact of the register plate with the ends of the reciprocated keys.

In testimony whereof we affix our signatures in presence of two witnesses.

ENOS B. WILLIX.
ELMER L. KEITH.

Witnesses:
J. EVANS COLTON,
W. A. SMYTH.